US008482793B2

(12) United States Patent
Xu et al.

(10) Patent No.: US 8,482,793 B2
(45) Date of Patent: Jul. 9, 2013

(54) MEMORY EFFICIENT ELECTRONIC REGISTRATION METHOD THAT COMPENSATES IMAGE CONTENT AND PREVENTS HALFTONE MOIRÉ

(75) Inventors: Beilei Xu, Penfield, NY (US); Robert P. Loce, Webster, NY (US); Joseph C. Sheflin, Macedon, NY (US); Daniel W. Costanza, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 868 days.

(21) Appl. No.: 12/644,081

(22) Filed: Dec. 22, 2009

(65) Prior Publication Data

US 2011/0149309 A1    Jun. 23, 2011

(51) Int. Cl.
    *G06F 15/00*    (2006.01)
(52) U.S. Cl.
    USPC ............ 358/1.9; 358/525; 358/505; 358/504; 358/3.01; 358/3.04; 358/3.06; 382/294
(58) Field of Classification Search
    USPC ................ 358/1.9, 525, 505, 504, 3.01, 3.04, 358/3.06; 382/294
    See application file for complete search history.

(56) References Cited

U.S. PATENT DOCUMENTS

| 5,251,271 | A | 10/1993 | Fling |
| 5,719,680 | A | 2/1998 | Yoshida et al. |
| 5,732,162 | A | 3/1998 | Curry |
| 5,760,914 | A | 6/1998 | Gauthier et al. |
| 6,006,015 | A | 12/1999 | Bender et al. |
| 6,118,463 | A | 9/2000 | Houki et al. |
| 6,134,022 | A | 10/2000 | Yamamoto et al. |
| 6,208,753 | B1 | 3/2001 | Braudaway et al. |
| 6,243,100 | B1 | 6/2001 | Curry et al. |
| 6,310,695 | B1 | 10/2001 | Gauthier et al. |
| 6,359,640 | B1 | 3/2002 | Ravitz et al. |
| 6,519,055 | B1 | 2/2003 | Curry et al. |
| 6,529,643 | B1 | 3/2003 | Loce et al. |
| 6,608,643 | B2 | 8/2003 | Lofthus et al. |
| 6,816,269 | B1 | 11/2004 | Loce et al. |
| 7,031,021 | B1* | 4/2006 | Lain et al. ..................... 358/1.9 |
| 7,123,282 | B2 | 10/2006 | Fields et al. |
| 7,330,202 | B2 | 2/2008 | Schweger et al. |
| 7,453,608 | B2 | 11/2008 | Kambegawa et al. |
| 2003/0175602 | A1 | 9/2003 | Kazama |
| 2004/0200369 | A1 | 10/2004 | Brady |
| 2006/0077489 | A1* | 4/2006 | Zhang et al. .................. 358/504 |
| 2006/0092264 | A1 | 5/2006 | Matsuzaki et al. |

(Continued)

FOREIGN PATENT DOCUMENTS

| JP | 2001309139 A | 11/2001 |
| JP | 2006054516 A | 2/2006 |
| JP | 2006056098 A | 3/2006 |
| JP | 2006074274 A | 3/2006 |
| JP | 2006080712 A | 3/2006 |
| JP | 2006123391 A | 5/2006 |
| JP | 2006234941 A | 9/2006 |

*Primary Examiner* — Twyler Haskins
*Assistant Examiner* — Michael Burleson
(74) *Attorney, Agent, or Firm* — Fay Sharpe LLP

(57) ABSTRACT

Systems and methods are described that facilitate compensating for slow scan direction displacement (e.g., skew and/or bow) defects in a raster line using slow-scan electronic registration. Input image data is buffered at low-resolution (e.g., 600 spi or the like). Displacement compensation is performed as the low-resolution contone image data is converted to high-resolution (e.g., 2400 spi or the like), and a displaced (e.g., staggered) halftoning threshold array is indexed to account for detected displacement. Displacement compensation is again performed during conversion of the high-resolution contone image data to high-resolution binary image data that is used to generate an output image.

24 Claims, 4 Drawing Sheets

U.S. PATENT DOCUMENTS

| | | |
|---|---|---|
| 2007/0139715 A1 | 6/2007 | Kazama et al. |
| 2007/0165283 A1 | 7/2007 | Matsuzaki et al. |
| 2008/0174799 A1 | 7/2008 | Higashiyama et al. |
| 2008/0218543 A1 | 9/2008 | Marra et al. |
| 2008/0239336 A1 | 10/2008 | Tanabe et al. |
| 2008/0266619 A1 | 10/2008 | Ang et al. |
| 2009/0034007 A1 | 2/2009 | Sano et al. |
| 2009/0034029 A1 | 2/2009 | Nakamura |
| 2009/0034034 A1* | 2/2009 | Ido ................................. 358/525 |
| 2009/0040556 A1 | 2/2009 | Kambegawa et al. |
| 2009/0142004 A1* | 6/2009 | Gentner et al. ............... 382/294 |

* cited by examiner

MEMORY EFFICIENT ELECTRONIC REGISTRATION METHOD THAT COMPENSATES IMAGE CONTENT AND PREVENTS HALFTONE MOIRÉ

BACKGROUND

The subject application relates to electronic registration systems and methods. While the systems and methods described herein relate to bow and skew correction using electronic registration in digital images and the like, it will be appreciated that the described techniques may find application in other image correction systems, other xerographic applications, and/or other image correction methods.

Conventional electronic registration techniques require high resolution scan line buffers to span the range of raster line bow and skew that is being compensated. Some methods reduce the memory requirement for resolutions of interest, but do not compensate the halftone screen for bow and skew, thereby incurring a high risk for color-to-color moiré.

Electronic registration is used to save cost over currently practiced opto-mechanical methods. One consideration in conventional electronic registration applications is the cost of the scan line buffers needed to span a skewed and bowed scan line, as it is desirable to bring down the cost of the scan line buffers.

One such conventional electronic registration method performs electronic registration after halftoning is performed, and requires high resolution (2400 spi) scan line buffers to span the range of raster line bow and skew being compensated. Conventional systems require a plurality of image pixel data raster lines that span a raster output scanner (ROS) physical raster line, all of which need to be held in memory to extract the pixels of interest. For conventional 2400 spi pixels and rasters, approximately 100 high speed binary scan line memory buffers are needed per millimeter of compensation.

If raster buffering is performed in the low resolution contone state, the memory requirement for the image data can be reduced by approximately one half for the current resolutions of concern (e.g., 2400 spi 1-bit/pixel requires twice the memory of 600 spi 8-bits/pixel). However, existing electronic registration methods that attempt to reduce memory requirements fail to compensate the halftone screen angle for bow and skew.

Accordingly, there is an unmet need for systems and/or methods that facilitate reducing the cost of expensive scan line buffering for electronic registration for low cost products while mitigating color-to-color moiré, and the like, while overcoming the aforementioned deficiencies.

BRIEF DESCRIPTION

In accordance with various aspects described herein, systems and methods are described that facilitate compensating for bow and skew defects in a digital image. For example, a method of electronic registration for correcting one or more displacement defects in an input image comprises receiving, at a first resolution, line buffer data and metadata tag buffer data describing input image pixels, and extracting contone pixels intersecting physical raster lines traversed by a displaced raster line with displacement in the process direction in the input image. The method further comprises transforming the extracted contone pixels to a second resolution that is a higher resolution than the first resolution, generating a compensated high-resolution contone raster line from the transformed extracted contone pixels using one or more compensation parameters, and determining indices that describe a shape of the raster line. Additionally, the method comprises generating a halftone array using the determined indices, the array comprising a plurality of blocks of pixels, and generating high-resolution binary pixel data for the raster line by applying the displaced halftone array to the high-resolution contone raster line. The method also comprises outputting the high-resolution binary pixel data to a raster output scanner (ROS), and outputting an output image from the ROS wherein the displacement defect(s) is removed.

According to another aspect, a system that facilitates correcting one or more displacement defects in an input image using electronic registration comprises a displaced image content (DIC) component that receives, at a first resolution, line buffer data and metadata tag buffer data describing input image pixels, and extracts contone pixels intersecting physical raster lines traversed by a displaced raster line having displacement in the process direction in the input image. The DIC component transforms the extracted contone pixels to a second resolution that is higher than the first resolution, and generates a compensated high-resolution contone raster line from the transformed extracted contone pixels using one or more compensation parameters. The system further comprises a halftoner component with displacement indexing (HDI) that determines indices that describe a shape of the raster line, and generates a displaced halftone array using the determined indices, the array comprising a plurality of blocks of pixels. The HDI generates high-resolution binary pixel data for the raster line by applying the displaced halftone array to the high-resolution contone raster line and outputs the high-resolution binary pixel data. The system further comprises a raster output scanner (ROS) that receives the high-resolution binary pixel data and generates an output image wherein the displacement defect(s) is removed.

According to another aspect, a computer-executable method of correcting for displacement defects in a digital image comprises receiving an input image at a first resolution, measuring an amount of displacement in a displaced raster line in the input image, and calculating an amount of inverse distortion to apply to each pixel in the displaced raster line for subsequent colors of the image to correct the displacement defect. The method further comprises compensating for displacement in the displaced raster line by applying the inverse distortion to contone pixels in the displaced raster line while converting the contone pixels in the displaced raster line to a second resolution that is higher than the first resolution. Additionally, the method comprises generating a displaced halftone array comprising a plurality of pixel blocks arranged in a staggered pattern. Using the displaced halftone array, high-resolution, displacement-compensated contone pixels are converted into high-resolution binary pixels and applying the inverse distortion to the high-resolution binary pixels to further compensate for displacement in the binary pixels. The method further comprises generating an output image wherein the displacement defects have been corrected.

DETAILED DESCRIPTION

In accordance with various features described herein, systems and methods are described that overcome the above-described problems by reducing memory requirements while maintaining and/or improving slow scan direction displacement compensation quality.

Figure 1:
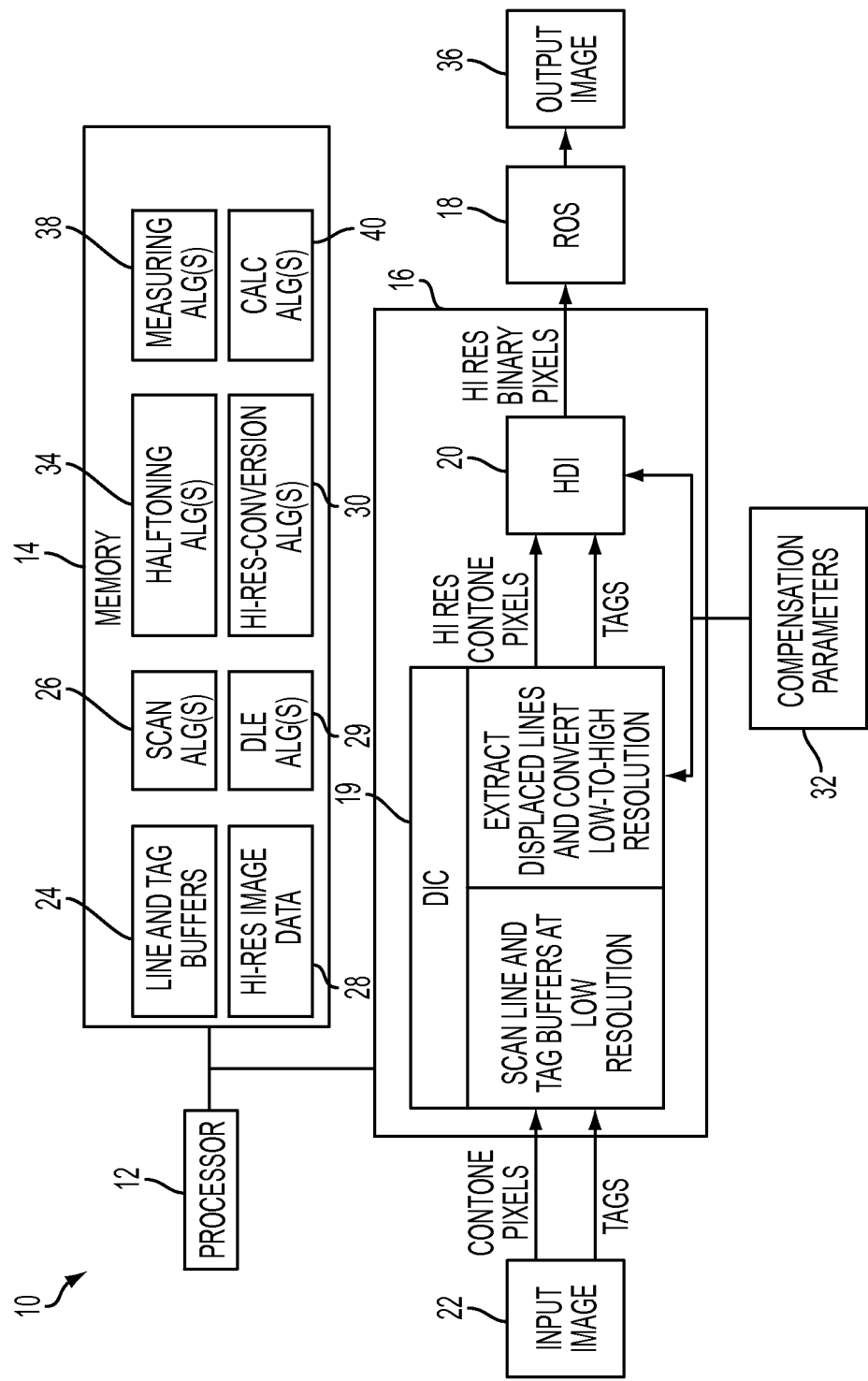
FIG. 1 illustrates an electronic image registration system that facilitates performing slow scan electronic registration in a manner that significantly reduces scan line buffer requirements.

FIG. 1 illustrates an electronic image registration system 10 that facilitates performing slow scan electronic registration in a manner that significantly reduces scan line buffer requirements. "Slow scan" refers to the direction of marking processing movement. For example, it is the direction of photoreceptor movement in a xerographic laser printer. The slow scan direction is perpendicular to the scan direction of a ROS of the linear direction of an image bar imaging system. The electronic image registration system 10 is used to compensate for output scanner slow scan direction displacement defects, such as skew and bow. "Skew" is a defect that may be introduced when an angular misalignment occurs in the printing systems such as the ROS beam follows an angled path across the photoreceptor. "Bow" is a defect that may occur when the ROS beam follows a curved path across the photoreceptor. In its simplest form bow can be parabolic in shape, while in real practical laser scanners it could possess a more complicated form. Also, forms of skew and bow can occur in image bar printers where the bar is not aligned perfectly perpendicular to the slow scan direction nor perfectly linear. Electronic registration systems adjust the spatial coordinates of the image data to properly align the output image for display or print. The system 10 operates by buffering input image data at a relatively low input resolution (e.g., 600 spi), performing a compensation algorithm on the image data to correct for slow scan displacement defects, such as skew and bow, as the image data is converted to a relatively high output resolution (e.g., 2400 spi), and indexing a halftone threshold array to select thresholds in a manner that accounts for the slow scan displacement defects. The system 10 reduces scan line memory requirements by a factor of 2 or more when compared to conventional techniques, while achieving color-to-color registration of image content and preventing halftone moiré.

Another source of skew error is paper skew. The effect of paper skew can be divided into two categories: (1) the image relative to paper can be skewed, and (2) color to color can be skewed in some printing architectures. For example, in a printing architecture where the paper may be skewed when the toner image is transfer to it, the skew may be due to physical handling of the paper or due to a non-orthogonal cut of the paper. This would create an image-to-paper skew, which is undesirable. The described systems and methods can correct for such paper skew given knowledge of how much the paper is skewed. Such knowledge can be obtained via the measurement component or a sensor (not shown) that detects the paper position and angle prior to transfer. In some cases where the skew is repetitive, the amount of skew can be learned for a given paper type, and the correction is applied whenever encountering that paper type. A second, and related type of skew error has to do with multiple transfers to paper that can occur in an architecture where color separations are transferred to paper at separate times. For example, for a conventional four-colorant system, a printing architecture may transfer each of cyan, magenta, yellow, and black image separations to papers at different times. The paper can become skewed between transfers, thereby causing a color-to-color skew. This problem can occur when one or more transfers are done at one time and an additional one or more are done later.

The system 10 comprises a processor 12 that executes, and a memory 14 that stores, computer-executable instructions for performing the various functions, techniques, methods, etc., described herein. The processor 12 and the memory 14 are coupled to each other and to a rendering module 16, which is further coupled to an imaging component such as a raster output scanner (ROS) 18 or the like. It will be appreciated that although the systems and methods described herein refer to an ROS component, other suitable imaging components may be employed in conjunction with the described systems and methods. It further will be appreciated that the processor 12 and memory 14 may be integral to the rendering module 16, in one embodiment.

The rendering module 16 renders an image to printable forms (e.g., prepares an image to be printed, drives one or more imaging devices, etc., and comprises a displaced image content (DIC) module 19 and a compensating halftoner with displacement indexing (HDI) module 20. For instance, skew and bow are forms of physical raster line displacement in the marking process direction (direction of photoreceptor movement). The DIC module 19 compensates input image content, and the HDI module 20 is a compensating halftoner. The DIC component 19 receives contone (continuous tone) pixel data and metadata tags (e.g., metadata describing image content for each pixel or block or pixels) for an input image 22. The tags may be, for instance, 4-bit tags (e.g., having 16 possible values) that may describe the pixel properties (e.g., text, background, etc.) or describe a desired halftone treatment (such as use a "halftone pixel at 200 cycles per inch". The DIC component 19 scans line and tag buffers 24 at a relatively low resolution. In one example, the line and tag buffers 24 are scanned at 600 spots per inch (spi), by executing one or more scan algorithms 26 (e.g., set(s) of computer-executable instructions) stored in the memory 14. The DIC component 19 extracts data along a skewed or bowed physical line, increases the resolution thereof, and stores the high-resolution skewed line data 28 to the memory 14.

In one example, the DIC component 19 increases the resolution of the skewed line data from approximately 400-800 spi to approximately 1600-3200 spi. In another example, the DIC component increases the resolution of the skewed line data from approximately 600 spi to approximately 2400 spi. This action is performed by the DIC component 19 (in conjunction with or separately from the system processor 12) by executing one or more displaced line extraction (DLE) algorithms 29, and one or more hi-resolution data conversion algorithms 30, stored in the memory 14. Additionally, one or more compensation parameters 32 are applied by the DIC component 19 during skewed line extraction and conversion. The compensation parameters include inverse distortion values that compensate for detected skew and bow. Although shown as being separate from the memory 14, it will be understood that the configuration parameters 32 are stored in the memory 14.

High-resolution contone pixel data and metadata tag information are provided from the DIC component 19 to the HDI component 20. The HDI component 20 applies one or more compensation parameters 32 to the high-resolution contone pixel data, and executes halftoning instructions or algorithms 34 to generate high-resolution binary output pixel data that is provided to the ROS component 18. The ROS component 18 then generates an output image 36 for printing or viewing by a user. The ROS, or more generally "imager," produces either a directly viewable image or a latent image that becomes viewable after additional marking operations. For example, a laser raster output scanner (laser ROS) or an optical imaging array, such as an LED imaging array writes an optical image on a photoreceptor, that becomes a voltage image, that is developed with toner and transferred to paper. An ink jet array can directly mark on paper, which can be directly viewed.

The system 10 additionally includes a measurement module or algorithm 38 that is executed by the processor 12 to measure skew and bow (e.g., displacement in the process direction) in a calibration image, and a calculation module or algorithm 40 that calculates the compensation parameters 32 (e.g., inverse distortion to compensate for the displacement in relevant pixels) for correcting the skew and/or bow measured by the measuring module 38. Using the compensation parameters 32, the DIC component 19 buffers scan lines for an input image at the input low resolution in sufficient number to span the range of raster line bow and skew being compensated.

The inverse distortion parameters for each pixel are stored as compensation parameters 32. The compensation parameters are applied by the DIC component 19 to compensate for displacement (e.g., skew and/or bow) in the contone pixels. Additionally, the compensation parameters 32 are applied by the HDI component 20 to correct for skew and/or bow in the high-resolution binary pixels output by the HDI component 20.

As previously mentioned, the system 10 comprises the processor 12 that executes, and memory 14 that stores, computer-executable instructions and/or computer-readable data for performing the various techniques and/or methods described herein. The memory 14 may be a computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a ROM, a PROM, an EPROM, a FLASH-EPROM, or other memory chip or cartridge, or any other tangible medium from which a computer can read and use. Alternatively, the method may be implemented in a transmittable carrier wave in which the control program is embodied as a data signal using transmission media, such as acoustic or light waves, such as those generated during radio wave and infrared data communications, and the like.

Figure 2:
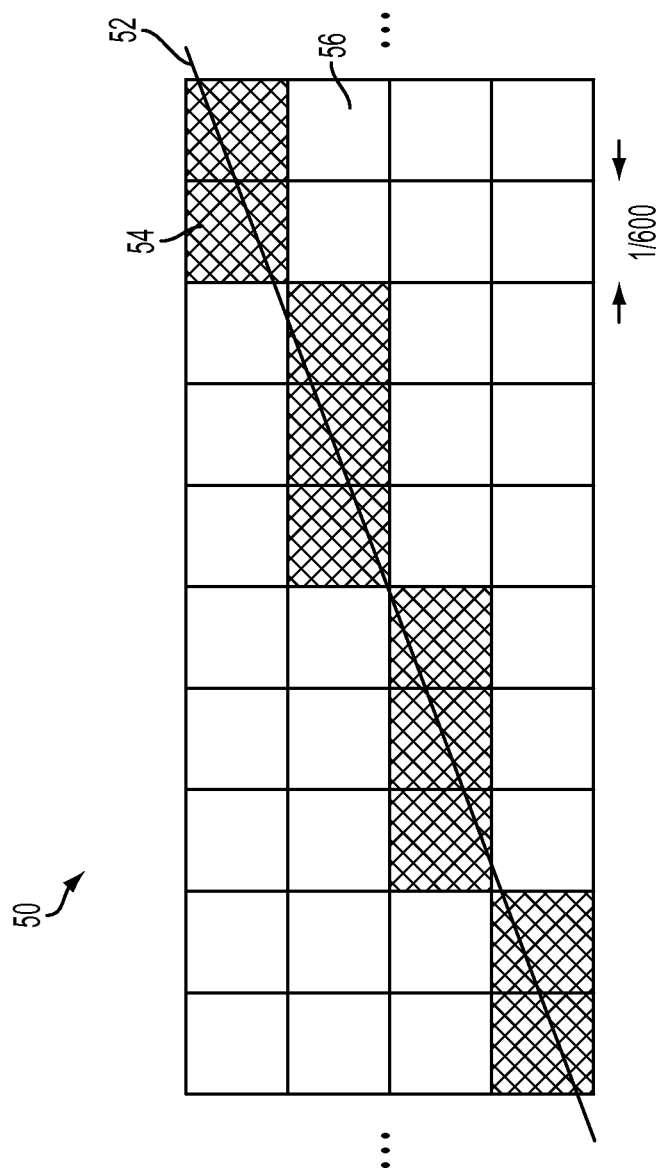
FIG. 2 illustrates schematic example of a segment of a skewed raster line straddling low resolution (e.g., 600 spi) contone scan line buffers.

With continued reference to FIG. 1, FIG. 2 illustrates schematic example 50 of a segment of a skewed raster line 52 straddling low resolution (e.g., 600 spi) contone scan line buffers. Hatched pixels 54 indicate the pixels that should be used to generate signals to drive the ROS 18 (FIG. 1) at each position on the output image 36. Un-hatched pixels 56 are pixels through which the skewed line does not pass. Each pixel 54, 56 has a gray-scale value, such as an 8-bit value ranging from 0-255 which is converted by the HDI component 20 into a 1 or a 0 (e.g., a binary value, as is known in the art) to halftone the image data. The positions are determined from the compensation parameters 32 (FIG. 1) generated by the measurement module or algorithm 38 (FIG. 1) and calculation module or algorithm 40 (FIG. 1), which provide a usable description of the raster line shape, such as a functional form (e.g., linear, quadratic, or the like), or nodes for interpolation. For the 600 spi pixels and rasters used by classical high-resolution techniques, approximately 25 high speed scan line memory buffers are needed per millimeter of compensation. For a given amount of compensation, the herein-described contone technique uses approximately 50% of the pixel value buffering employed by the classical high resolution techniques. A skewed high resolution raster line is thus extracted from the skewed low resolution pixels 54.

The image pixel values exiting the DIC stage of processing are "pre-halftone." Hence, each pixel may possess a halftone tag (e.g., a 2- or 4-bit per pixel tag) that describes halftone attributes thereof. Skew and/or bow compensation is applied to the image content by extracting the relevant pixels 54 (e.g., pixels intersecting the physical raster lines, shown as hatched squares in FIG. 2), converting the pixels to high resolution, and using the high resolution pixels that intersect the raster to form a compensated output raster line of image data. A similar process is performed with the metadata tags, which store state and/or command information for their respective pixels. For instance, a 4-bit tag value may indicate one of states 0-15, such as "halftone pixel at 200 cycles per inch." Additionally, the tag information may include an indication of the type of pixel (e.g., text, graphic, background, etc.) The output of this stage is a compensated contone raster line and its corresponding raster line of tags. The compensated high resolution image data and tags are input to the HDI component 20.

Figure 3:
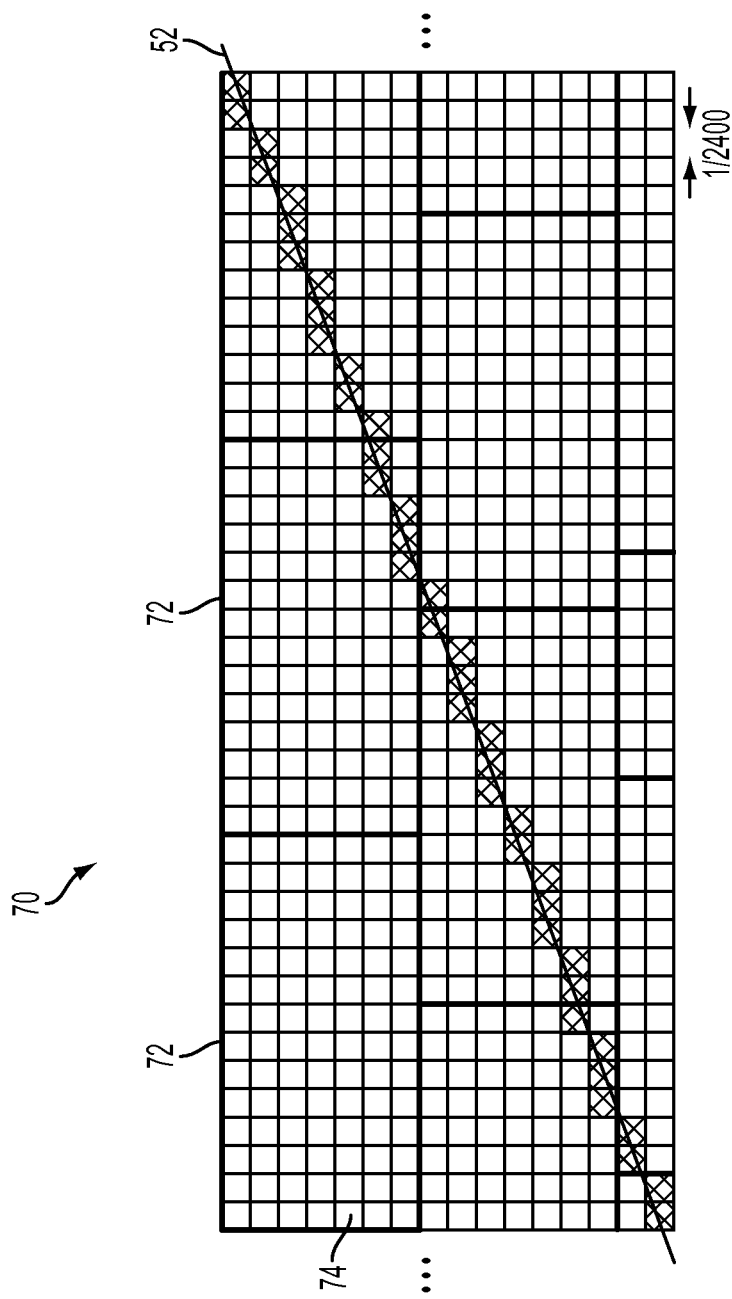
FIG. 3 illustrates a schematic example of a halftone threshold array that is employed by the compensating halftoner, in accordance with one or more aspects described herein.

With continued reference to FIGS. 1 and 2, FIG. 3 illustrates a schematic example of a halftone threshold array 70 that is employed by one or more aspects described herein. As in image content compensation, the indices of the halftone threshold array 70 are determined from the compensation parameters 32 generated by the measurement module 38 and calculation module 40, and provide a usable description of the raster line shape. The threshold blocks 72 each comprise a block of pixels 74 that are assigned a common threshold contone value at each pixel location (e.g., 0-255), and can be indexed according to the raster line shape, or can be obtained by interpolation of thresholds that are on either side of the skewed raster line 52.

According to an example, the threshold blocks 72 are configured (and stored) with a threshold at the output resolution (e.g., 2400 spi, in the described example, although other values are permitted). The HDI component 20 indexes the threshold blocks along a skewed (e.g., staggered) path, thereby mitigating a need for additional memory buffers.

Figure 4:
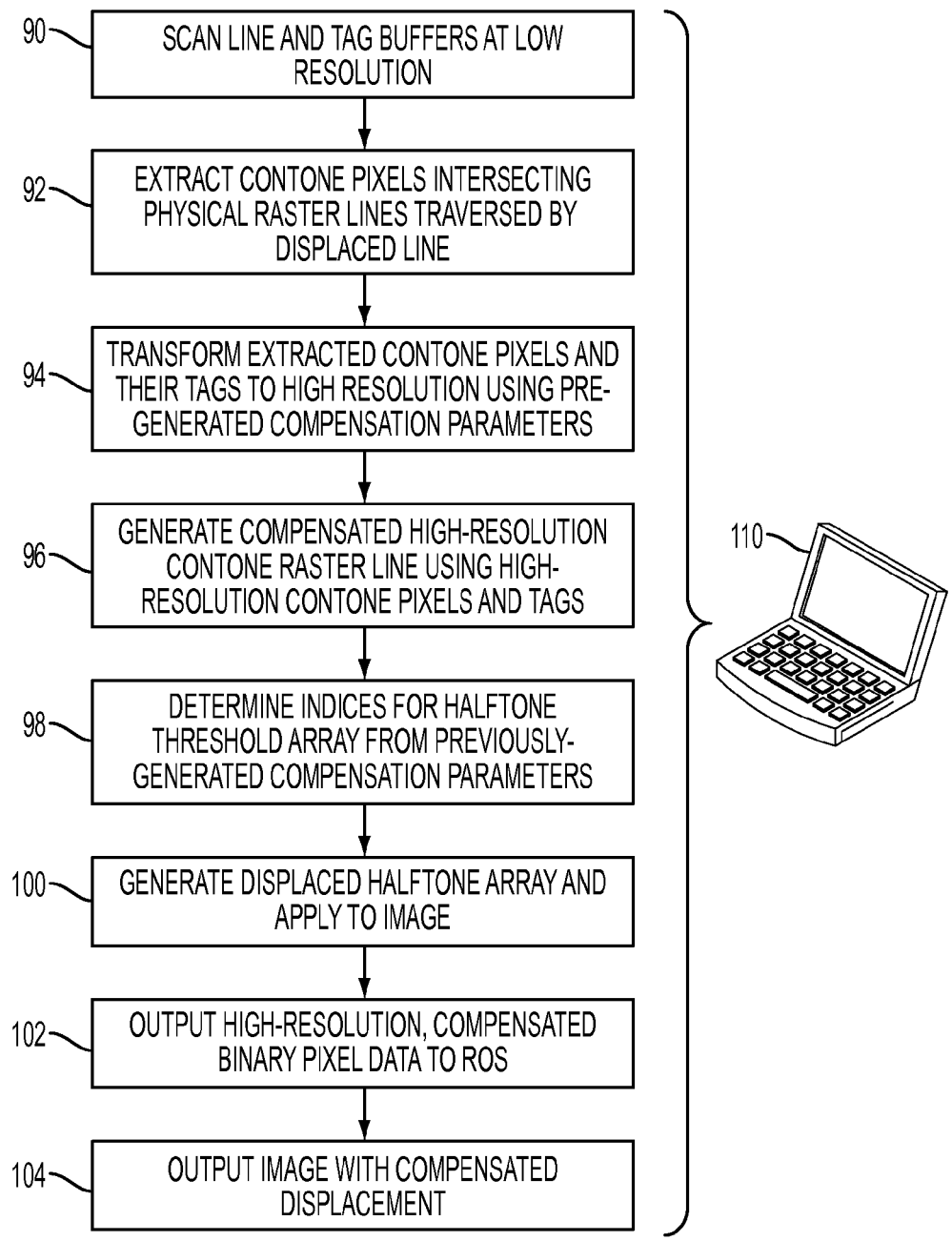
FIG. 4 illustrates a method for correcting slow scan direction displacement defects during electronic image registration while preventing moiré, in accordance with various aspects described herein.

FIG. 4 illustrates a method for correcting displacement (e.g., skew and/or bow) defects during electronic image registration while preventing moiré, in accordance with various aspects described herein. At 90, raster line and tag buffers for an input image are scanned at low resolution. At 92, contone pixels intersecting physical raster lines traversed by a displaced (e.g., skewed or bowed) line are identified and/or extracted using pre-generated compensation parameters. At 94, the exacted contone pixels and their tags are converted or transformed from low resolution to high resolution. In one example, the low resolution scan at 90 is performed at 600 spi, and the extracted contone pixels are then converted to 2400 spi at 94. The compensation parameters are pre-generated by measuring an amount of displacement for a displaced raster line in a calibration image or images from previous printing stages and calculating an appropriate amount of inverse distortion to apply to each pixel traversed by the displaced line to compensate for the displacement and correct the defect. That is, displacement compensation parameters are applied to the image content by extracting the relevant pixels (those intersecting the physical raster lines), converting those pixels to high resolution, and using the high resolution pixels that intersect the raster to form a compensated output raster line of image data. A similar process is performed with the metadata tags for each pixel. At 96, a compensated contone raster line and its corresponding raster line of tags are generated.

The compensated high resolution image data and tags are input to a compensating halftoner (e.g., the HDI component 20 of FIG. 1). A schematic example of the halftone threshold array employed by the compensating halftoner is shown in FIG. 3. As in classical image content compensation, the indices of the halftone threshold array are determined from the compensation parameters generated (e.g., by a measurement module and calculation module that provide a usable description of the displaced raster line shape), at 98. In one example, the thresholds are indexed according to the raster line shape. In another example, the thresholds are obtained by interpolation of thresholds that are on either side of the displaced raster line. At 100, a displaced halftone array is generated and applied to the image to generate binary pixel data. That is, pixels in each block are compared to the threshold for the block, and, if a given pixel is greater than or equal to the threshold for its block, it is assigned a binary value of 1 and will trigger a laser in the ROS. Pixels whose value is less than the threshold value are assigned a binary value of 0 and will not trigger the ROS laser.

At 102, high-resolution, compensated binary pixel data is output to an ROS device. At 104, an output image is generated in which displacement compensation has been performed to correct displacement defects present in the input image.

The method illustrated in FIG. 4 may be implemented in a computer program product that may be executed on a computer 110 or computing device in the system of FIG. 1. Further, it is to be appreciated that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiments.

The computer can include a processing unit such as the processor 12 of FIG. 1, a system memory such as the memory 14 of FIG. 1, and a system bus that couples various system components including the system memory to the processing unit. The processing unit can be any of various commercially available processors (e.g., a central processing unit, a graphical processing unit, etc.). Dual microprocessors and other multi-processor architectures also can be used as the processing unit.

The system bus can be any of several types of bus structure including a memory bus or memory controller, a peripheral bus, and a local bus using any of a variety of commercially available bus architectures. The computer memory includes read only memory (ROM) and random access memory (RAM). A basic input/output system (BIOS), containing the basic routines that help to transfer information between elements within the computer, such as during start-up, is stored in ROM.

The computer can further include a hard disk drive, a magnetic disk drive, e.g., to read from or write to a removable disk, and an optical disk drive, e.g., for reading a CD-ROM disk or to read from or write to other optical media. The computer typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A number of program modules may be stored in the drives and RAM, including an operating system, one or more application programs, other program modules, and program non-interrupt data. The operating system in the computer can be any of a number of commercially available operating systems.

A user may enter commands and information into the computer through a keyboard (not shown) and a pointing device or stylus (not shown), such as a mouse. Other input devices (not shown) may include a microphone, an IR remote control, a joystick, a game pad, a satellite dish, a scanner, or the like. These and other input devices are often connected to the processing unit through a serial port interface (not shown) that is coupled to the system bus, but may be connected by other interfaces, such as a parallel port, a game port, a universal serial bus (USB), an IR interface, etc.

A monitor (not shown), or other type of display device, may also be connected to the system bus via an interface, such as a video adapter (not shown). In addition to the monitor, a computer typically includes other peripheral output devices (not shown), such as speakers, printers etc. The monitor can be employed with the computer to present data that is electronically received from one or more disparate sources. For example, the monitor can be an LCD, plasma, CRT, etc. type that presents data electronically. Alternatively or in addition, the monitor can display received data in a hard copy format such as a printer, facsimile, plotter etc. The monitor can present data in any color and can receive data from the computer via any wireless or hard wire protocol and/or standard.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device.

It will be appreciated that network connections described herein are exemplary and other means of establishing a communications link between the computers may be used.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-executable method of electronic registration for correcting one or more process direction displacement defects in an input image, comprising:
receiving, at a first resolution, line buffer data describing input image pixels;
extracting contone pixels intersecting physical raster lines traversed by a displaced raster line with displacement in the process direction in the input image using one or more compensation parameters;
transforming the extracted contone pixels to a second resolution that is a higher resolution than the first resolution;
generating a compensated high-resolution contone raster line from the transformed extracted contone pixels;
determining indices that describe a shape of the raster line;
extracting halftone thresholds using the determined indices, the thresholds substantially corresponding to the shape of the raster line;
generating high-resolution binary pixel data for the raster line by applying the extracted displaced halftone thresholds to the high-resolution contone raster line;
outputting the high-resolution binary pixel data to an imager; and
outputting an output image from the imager wherein the displacement defect(s) is removed.

2. The method of claim 1, wherein the one or more compensation parameters are generated by measuring an amount of displacement in the defective line and calculating an amount of inverse distortion that is applied to each contone pixel traversed by the displaced line, thereby compensating for the displacement and correcting the defect.

3. The method of claim 1, wherein the second resolution is approximately four times the first resolution.

4. The method of claim 1, wherein the second resolution is approximately 2400 spi and the first resolution is approximately 600 spi.

5. The method of claim 1, further comprising receiving, at a first resolution, metadata tag buffer data describing one or more of:
the input image pixels: and
operations to be performed on the input image pixels.

6. The method of claim 5, wherein the halftone thresholds are extracted from a plurality of halftone screens and the metadata tag buffer data is used to select a halftone screen from the plurality of halftone screens.

7. The method of claim 5, further comprising applying a calculated amount of inverse distortion to metadata tags in order to align the metadata to displacement the displaced raster line.

8. A processor that executes, and a computer-readable memory that stores, computer-executable instructions for performing the method of claim 1.

9. The method of claim 1, wherein the displacement defect is one or more of a raster line skew defect and a raster line bow defect.

10. The method of claim 1, wherein the displacement defect is a paper skew defect, and further comprising:
detecting paper position and skew angle prior to image transfer.

11. The method of claim 10, further comprising generating compensation parameters for a repetitive paper skew defect detected for a given type of paper, and applying the stored compensation parameters to correct for paper skew whenever the given paper type is detected.

12. The method of claim 1, wherein the imager the imager is one of a raster output scanner (ROS), an optical imaging array, and an ink jet array.

13. A system that facilitates correcting one or more displacement defects in an input image using electronic registration, comprising:
a displaced image content (DIC) component that:
receives, at a first resolution, line buffer data and describing input image pixels;
extracts contone pixels intersecting physical raster lines traversed by a displaced raster line having displacement in the process direction in the input image;
transforms the extracted contone pixels to a second resolution that is higher than the first resolution; and
generates a compensated high-resolution contone raster line from the transformed extracted contone pixels using one or more compensation parameters;
a halftoner component with displacement indexing (HDI) that:
determines indices that describe a shape of the raster line; and
generates a displaced halftone array using the determined indices, the array comprising a plurality of blocks of pixels;
generates high-resolution binary pixel data for the raster line by applying the displaced halftone array to the high-resolution contone raster line; and
outputs the high-resolution binary pixel data; and
a raster output scanner (ROS) that receives the high-resolution binary pixel data and generates an output image wherein the displacement defect(s) is removed.

14. The system of claim 13, further comprising:
a measurement module that measures an amount of displacement in the displaced raster line; and
a calculation module that calculates one or more compensation parameters that comprise an amount of inverse distortion that is applied to each pixel traversed by the displaced raster line to offset the displacement and correct the defect(s).

15. The system of claim 13, wherein the second resolution is approximately four times the first resolution.

16. The system of claim 13, wherein the second resolution is in the range of approximately 2000-2800 spi and the first resolution is in the range of approximately 500-700 spi.

17. The system of claim 13, wherein the DIC component receives, at a first resolution, metadata tag buffer data describing one or more of:
the input image pixels; and
operations to be performed on the input image pixels.

18. The system of claim 17, wherein the halftone thresholds are extracted from a plurality of halftone screens and the metadata tag buffer data is used to select a halftone screen from the plurality of halftone screens.

19. The system of claim 17, wherein the HDI component applies a calculated amount of inverse distortion to pixels in the raster line to correct for displacement in the raster line.

20. A computer-executable method of correcting for displacement defects in a digital image, comprising:

receiving an input image at a first resolution;

measuring an amount of displacement in a displaced raster line in the input image;

calculating an amount of inverse distortion to apply to each pixel in the displaced raster line to correct the displacement defect;

compensating for displacement in the displaced raster line by applying the inverse distortion to contone pixels in the displaced raster line while converting the contone pixels in the displaced raster line to a second resolution that is higher than the first resolution;

generating a displaced halftone array comprising a plurality of pixel blocks arranged in a staggered pattern;

using the displaced halftone array, converting high-resolution, displacement-compensated contone pixels into high-resolution binary pixels and applying the inverse distortion to the high-resolution binary pixels to further compensate for displacement in the binary pixels; and generating an output image wherein the displacement defects have been corrected.

21. The method of claim 20, wherein the second resolution is approximately four times the first resolution.

22. The method of claim 20, further comprising:

receiving, at a first resolution, metadata tag buffer data describing one or more of:

the input image pixels: and operations to be performed on the input image pixels;

wherein the halftone thresholds are extracted from a plurality of halftone screens and the metadata tag buffer data is used to select a halftone screen from the plurality of halftone screens.

23. The method of claim 20, wherein the first resolution is in the range of approximately 400-800 spi, and the second resolution is in the range of approximately 1600-3200 spi.

24. The method of claim 20, wherein the first resolution is approximately 600 spi, and the second resolution is approximately 2400 spi.

* * * * *